Dec. 29, 1959    P. KLAMP ET AL    2,918,881
CONVEYOR SYSTEM
Filed Sept. 15, 1952    9 Sheets-Sheet 1

INVENTORS
GERALD E. PERKINS
BY PAUL KLAMP
ATTORNEYS

Dec. 29, 1959   P. KLAMP ET AL   2,918,881
CONVEYOR SYSTEM

Filed Sept. 15, 1952   9 Sheets-Sheet 2

INVENTORS
GERALD E. PERKINS
BY PAUL KLAMP
ATTORNEYS

Dec. 29, 1959 P. KLAMP ET AL 2,918,881
CONVEYOR SYSTEM
Filed Sept. 15, 1952 9 Sheets-Sheet 8

INVENTORS
GERALD E. PERKINS
BY PAUL KLAMP
ATTORNEYS

United States Patent Office 2,918,881
Patented Dec. 29, 1959

2,918,881

CONVEYOR SYSTEM

Paul Klamp, Detroit, and Gerald E. Perkins, Birmingham, Mich., assignors to Mechanical Handling Systems, Inc., Detroit, Mich., a corporation of Michigan Application September 15, 1952, Serial No. 309,637

2 Claims. (Cl. 104—88)

The present invention relates generally to work holding conveyors and refers more particularly to improvements in monorail types of continuous conveyor systems.

It is an object of this invention to provide a conveyor embodying branch tracks extending from one or both sides of the main track section and having means forming a part of the main track section for switching the work advancing trolleys to one or both of the branch tracks so that the work parts suspended from the trolleys may be maintained stationary for as long a period as required without interrupting the movement of work carrying trolleys along the main track section.

It is another object of this invention to provide a conveyor system wherein the work advancing trolleys are automatically switched from the main track section to positions on branch track sections at opposite sides of the main track depending upon which of the branch track sections is open or unoccupied.

It is still another object of this invention to provide a conveyor system having means operative to prevent switching of the work advancing trolleys onto either or both of the branch track sections should the latter be occupied by a work advancing trolley.

It is a further object of this invention to provide a conveyor structure having provision for switching preselected work advancing trolleys from the main track onto a branch track where they may be stored or repaired.

It is still a further object of this invention to provide a conveyor structure possessing the foregoing features and at the same time composed of a relatively few simple parts capable of being inexpensively manufactured, assembled, and installed.

The foregoing, as well as other objects, will be made more apparent as this description proceeds, especially when considered in connection with the accompanying drawings, wherein:

Figure 18 is a sectional view taken substantially on the line 18—18 of Figure 5;

The conveyor system is an overhead power and free line monorail type comprising a frame 1, an upper track 2, a lower track 3, work advancing trolleys 4 supported on and movable along the upper track, load carriers 6 supported on and movable along the lower track 3, and a power driven chain 5 connected to the trolleys 4 for advancing the same together with the load carriers 6 along the lower track. The frame 1 is composed of a number of sections which are preferably carried by the overhead structural members of the building. More particularly, the frame has upper horizontal members 7, angle members 8 secured to and depending from the horizontal members 7, and lower horizontal channel members 9 extending between and secured to the angle members.

Figures 3, 4, 14A:
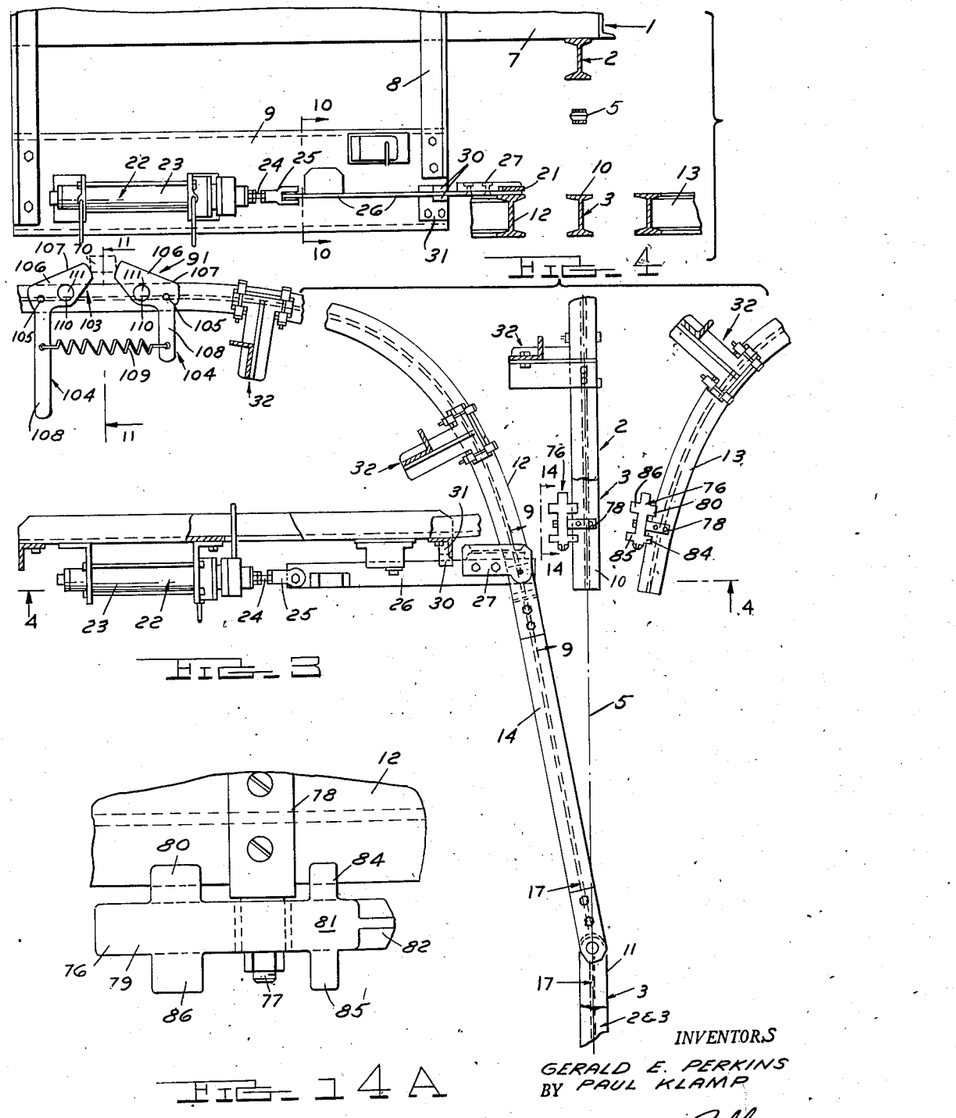
Figure 3 is a fragmentary plan view partly in section of the part of the conveyor shown in Figure 2.
Figure 4 is a sectional view taken substantially on the plane indicated by line 4—4 of Figure 3.
Figure 14A is a fragmentary elevational view of one of the stop dogs embodied in the conveyor system.
Figures 5, 8:
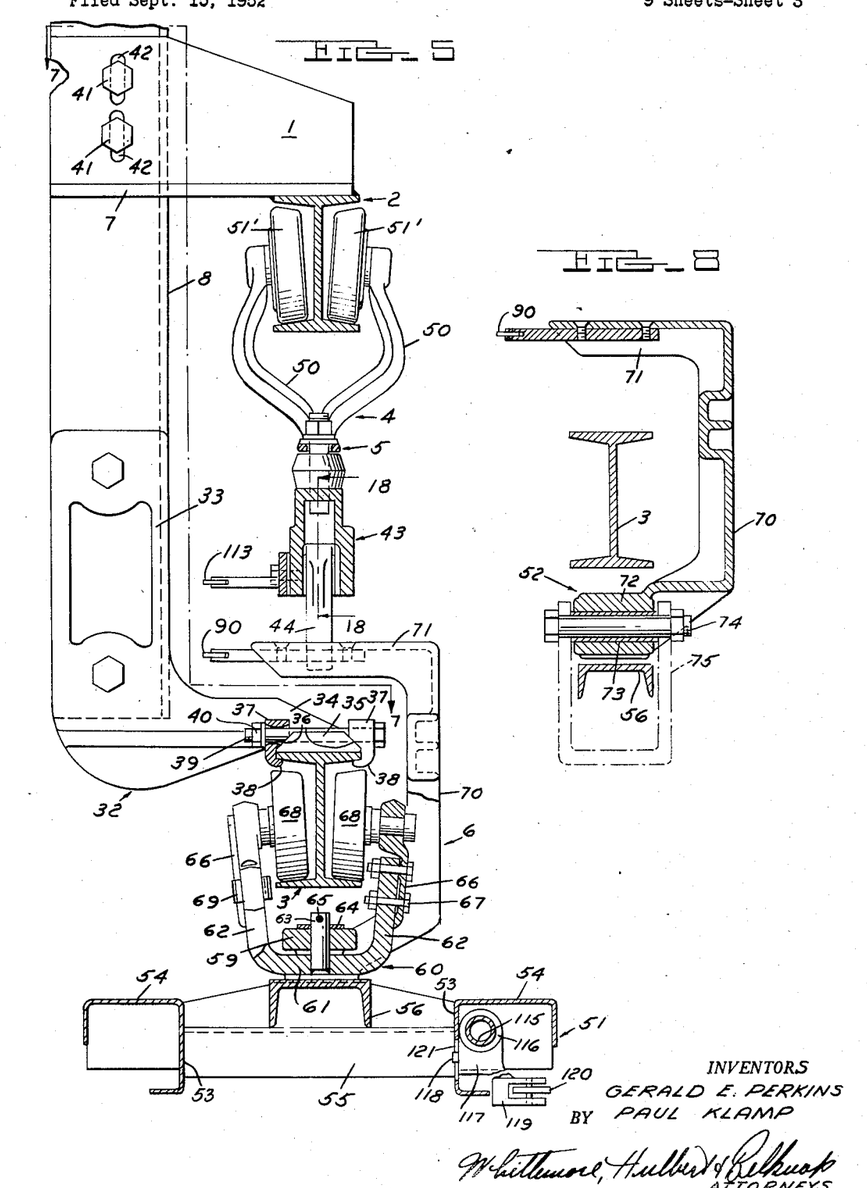
Figure 5 is a sectional view taken on the line 5—5 of Figure 6.
Figure 8 is a sectional view taken on the line 8—8 of Figure 6.

The upper track 2 and the lower track 3 are both formed of I-beam rails. As shown in Figure 3 of the drawings, the lower track is composed of aligned fixed main track sections 10 and 11, fixed branch sections 12 and 13 respectively positioned at opposite sides of the main track section 10 in lateral spaced relation thereto, and swinging switch sections 14. The main track sections 10 and 11 are positioned directly below the top track 2 with their median lines in substantially the same vertical plane as the median line of the top track 2, as shown in Figures 4 and 5 of the drawings.

The main track sections are longitudinally spaced from one another to provide gaps between adjacent ends thereof of sufficient length to receive the swinging switch sections 14. As will be presently described in detail, each section 14 has one end pivotally connected to the adjacent end of a fixed main section for swinging movement in a horizontal plane to selectively register the free end of the switch section with the main and branch track sections. In the present instance each swinging track section 14 is swung to the respective positions by a fluid pressure actuated motor assembly to be presently described in detail.

Figure 9:
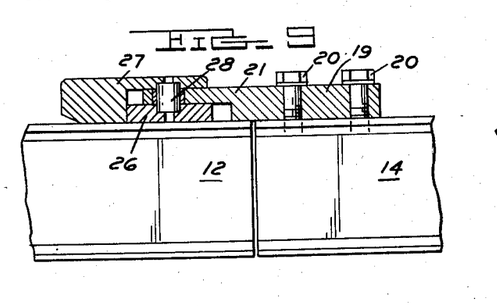
Figure 9 is a sectional view taken substantially on the line 9—9 of Figure 3.
Figure 10:
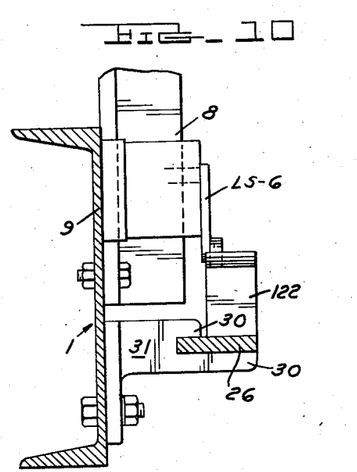
Figure 10 is a cross-sectional view taken on the line 10—10 of Figure 4.
Figures 14, 15, 17:
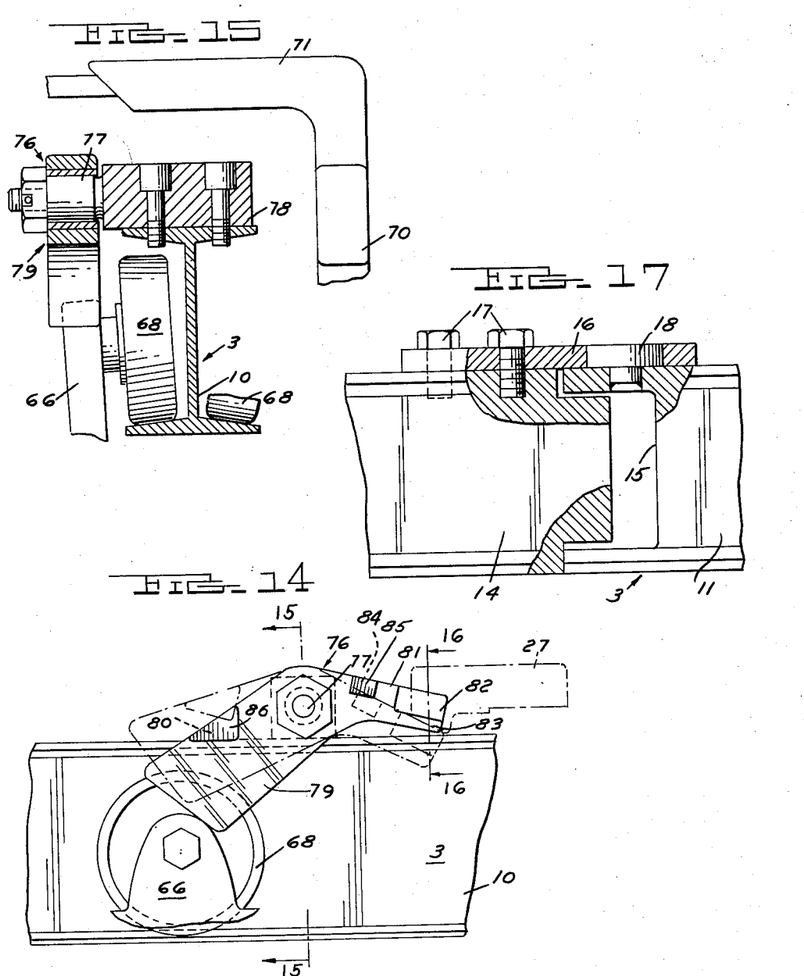
Figure 14 is an elevational view taken in the direction of the arrows 14—14 of Figure 3.
Figure 15 is a cross-sectional view taken on the line 15—15 of Figure 14.
Figure 17 is a sectional view taken substantially on the line 17—17 of Figure 3.
Figure 16:
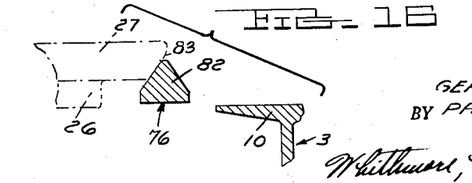
Figure 16 is a sectional view taken on the line 16—16 of Figure 14.

As shown in Figures 3 and 17 of the drawings, the ends of the flanges of each switch section 14 adjacent a fixed main track section 11 are cut away and the end of the web of the fixed main track section 11 is cut away to form a slot 15 for receiving the web of the switch section 14. A plate 16 is secured at one end to the top of the switch section 14 by studs 17 and the opposite end extends over the top of the fixed main section 11. A pivot pin 18 is provided for pivotally connecting the plate 17 to the top of the fixed main track section 11. Referring to Figure 9 of the drawings, it will be noted that a plate 19 is secured to the top of the switch section 14 at the free end thereof by studs 20. The bottom surface of the plate 19 projects beyond the free end of the switch section 14, and a projection 21 extends from the outer end of the plate 19 with its bottom surface spaced vertically from the bottom face of said plate 19. The construction is such that the bottom face of the plate 19 rests upon the top surfaces of either the fixed main track section 10 or the fixed branch track sections 12 and 13, depending upon the position of the switch section 14.

As stated above, each switch section 14 is swung about the axis of its associated pivot pin 18 by a fluid pressure actuated motor assembly. This assembly is indicated in Figure 4 of the drawings by the numeral 22 and is mounted upon one of the horizontal members 9 of the frame 1. The assembly 22 is of the same type disclosed in the Paul Klamp application, Serial No. 259,666, filed December 3, 1951, now Patent 2,716,965 of September 6, 1955, and is not described in detail herein. Briefly, the assembly 22 comprises a cylinder 23 suitably connected to a source of fluid under pressure and a piston (not shown) slidably supported within the cylinder.

The piston in the cylinder 23 of the assembly 22 is connected to the free end of a switch section 14 by a rod 24 and a link 26. The rod 24 projects outwardly through the outer end of the cylinder 23 and is connected to the inner end of the link 26 by a clevis 25. The outer end of the link 26 is pivotally connected to the projection 21 on the plate 19. In detail, the outer end of the link 26 (Figures 4 and 9) projects into the space provided between the projection 21 and the top of the main track section 10. A plate 27 is secured to the top of the link 26 at the outer end thereof and a portion of the plate 27 overlies the top of the projection 21. The adjacent surfaces of the plate 27 and outer end of the link are recessed to accommodate a vertical pin 28 which extends through an opening in the projection 21 to provide the required pivotal connection between the link 26 and plate 19.

It is apparent from Figures 3 and 9 of the drawings that the link 26 is supported at an elevation such that the outer end portion rests on the top surfaces of one or more of the fixed track sections 10, 12 and 13, depending upon the position of switch section 14. In any case, the link 26 is slidably supported intermediate the ends thereof between the furcations 30 of a bracket 31 suitably fixed on the frame 1 and thereby coacts with the fixed track sections to support the link 26 throughout movement thereof by the fluid pressure actuated assembly 22.

Figures 6, 7, 8:
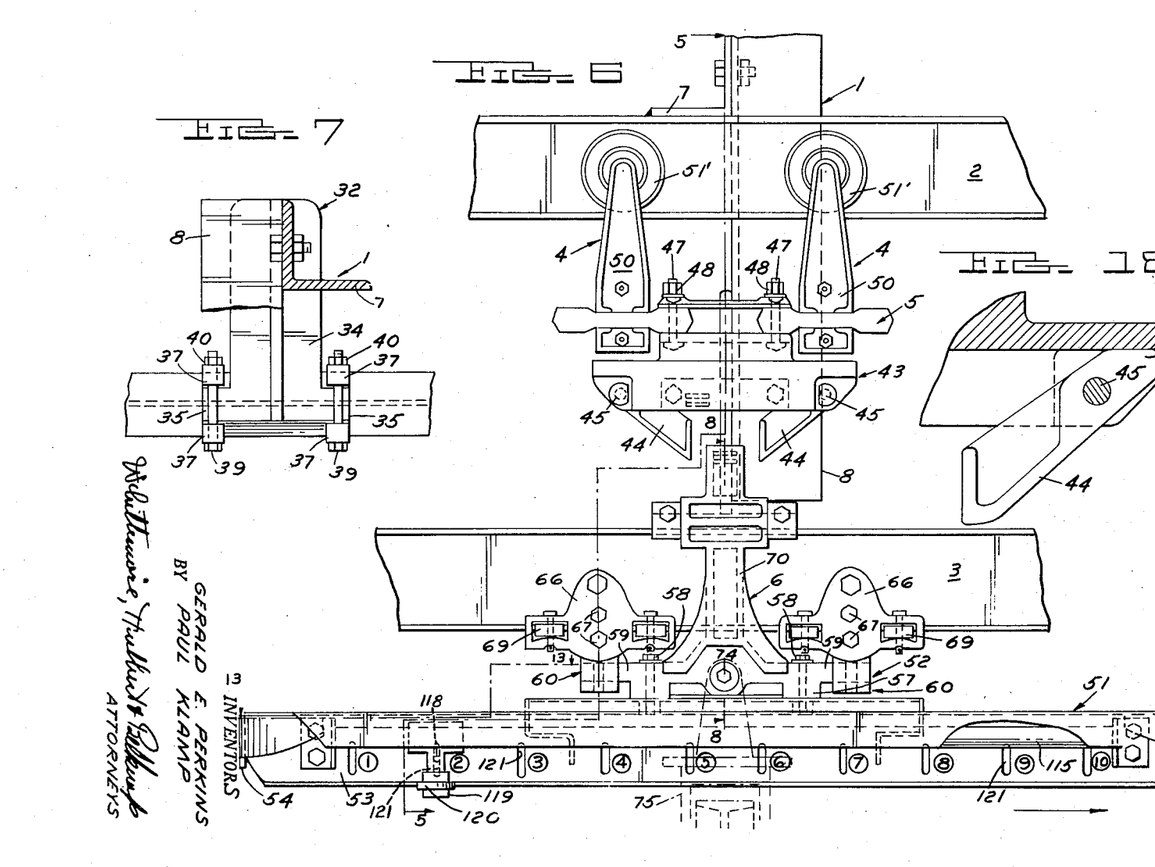
Figure 6 is a side elevational view of a part of the conveyor forming the subject matter of this invention.
Figure 7 is a sectional view taken substantially on the line 7—7 of Figure 5.

The upper track 2 is coextensive with the main fixed track sections 10, 11 and is fixed to the frame 1 by the members 7, as clearly shown in Figure 5 of the drawings. The lower track 3 is supported by a plurality of brackets 32 located at the same side of the lower track as the fluid pressure actuated cylinders 22 and spaced from each other longitudinally of the fixed main and branch track sections. Each bracket 32 has an upright arm 33 secured to an adjacent depending angle member 8 of the frame 1 and has a horizontally extending arm 34 provided at its end with the aligned oppositely extending projections 35, as shown in Figure 7 of the drawings. The projections 35 have a flat seating engagement with the top surface of an adjacent fixed section of the track 3 and have upwardly converging edge faces 36 at opposite sides thereof. Suitable clamping elements 37 are respectively located at opposite sides of the projections 35 and each clamp has a hook part 38 (Figure 5) which extends beneath the edges of the flanges on the adjacent fixed section of the track 3. The upper ends of the clamping elements 37 are formed with openings therethrough for receiving suitable bolts 39 and the projections 35 are recessed to provide clearance for the bolts 39. The bolts 39 have nuts 40 on the free ends thereof and coact with the clamping elements 37 at opposite sides of the projections 35 to clamp the adjacent portion of the track 3 to the bracket 32. It will further be noted from Figure 5 of the drawings that the clamping elements 37 and projections 35 have contacting upwardly tapering surfaces which cooperate upon tightening the bolts 39 to force the track 3 upwardly in firm engagement with the arm 34 of the adjacent bracket 32. Attention is called to the fact that the upper end portions of the frame members 8 are secured to the frame members 7 by bolts 41 which project through vertically elongated slots 42 in the members 7. Thus, the top and bottom tracks may be vertically adjusted with respect to one another.

Each work advancing trolley 4 has a load bar 43 of downwardly opening channel cross-section extending in the direction of the link type chain 5 and carrying pusher dogs 44 at opposite ends thereof. The upper ends of the dogs 44 project into the channel of the load bar 43 and are pivotally connected to the load bar by pins 45 (see Figure 18) which extend transversely through the ends of the bar 43. The dogs 44 extend downwardly in directions toward one another from the pivot pins 45 and the lower ends of the dogs are spaced from one another to receive therebetween a part of the load carrier 6 in a manner to be presently described. The pusher dogs 44 are held in their normal positions shown in Figure 6 of the drawings by providing each dog with an extension 46 (Figure 18) at the upper end fashioned to seat against the adjacent surface of the base of the channel shaped load bar 43.

The load bar 43 is positioned below the link chain 5 and the central portion of the bar is secured to the chain by bolts 47 and nuts 48. The bolts 47 project upwardly through openings in the base of the channel shaped bar 43 and form pivot pins for adjacent links of the chain 5. The construction is such that the bar 43 together with the pusher dogs 44, are advanced along the bottom track 3 by the chain 5. The particular construction of the chain 5 and the means for operating the same form no part of the present invention. It will suffice to point out that the chain 5 is continuously driven along its pre-selected path of travel by a power driven chain 49 indicated in Figure 1 of the drawings.

As stated above, the chain 5 is supported by and is movable along the top track 2. For accomplishing this result each trolley 4 has a pair of hangers 50 respectively located at opposite ends of the bar 43 above the latter. The lower ends of the hangers 50 are secured to adjacent links of the chain 5 in the usual manner and the upper ends straddle the top track 2. A pair of rollers 51' is journaled on the upper end of each hanger 50 in positions to have a rolling engagement with the bottom flanges of the track 2 at opposite sides of the web of said track, as shown in Figure 5 of the drawings.

Each load carrier 6 comprises an elongated bumper carrier 51 spaced below the bottom track 3 and a supporting bar 52 positioned between the bumper carrier 51 and the underside of the track 3. The bumper carrier 51 is in the form of a rectangular frame extending in the direction of length of the track 3 and having laterally spaced side members 53 connected at opposite ends to suitable bumper members 54. The side members 53 are connected intermediate the ends by cross bars 55 spaced from one another lengthwise of the bumper carrier 51 and connected intermediate the ends thereof by a brace 56. The brace 56 is channel shaped in cross-section and extends across the upper surfaces of the bars 55 with the channel opening downwardly.

The supporting bar 52 has an elongated part 57 extending in the direction of length of the bumper carrier 51 and secured to the brace 56 at longitudinally spaced points by fastener elements 58. The opposite ends of the bar 52 have projections 59 which are spaced above the brace 56 and are supported on suitable U-shaped brackets 60. The base portions 61 of the brackets 60 are respectively positioned beneath the projections 59, and the legs 62 of the brackets extend upwardly along opposite sides of the projections 59, as shown in Figure 5 of the drawings. Vertical pins 63 respectively extend through aligned openings in the projections 59 of the bar 52 and in the base portions 61 of the U-shaped brackets 60 to permit limited rotation of the brackets 60 relative to the bumper carrier 51. The pins 63 are held in place by suitable washers 64 sleeved on the upper ends of the pins and secured in place by pins 65 which extend through openings provided in the upper ends of the pins 63 above the washers, as also shown in Figure 5 of the drawings.

A pair of plates 66 are respectively secured to the outer sides of the leg portions 62 of the U-shaped brackets 60 by bolts 67 and the upper ends of the plates project above the legs 62. Suitable rollers 68 are respectively journaled on the upper ends of the plates 66 and these rollers are positioned to respectively ride along the top surfaces of the bottom flanges on the track 3 at opposite sides of the web portion of said track, as clearly shown in Figure 5 of the drawings. The construction is such that the bumper carriers 51 are effectively supported from the bottom track 3 for movement along this track by the power driven chain 5. As shown in Figure 6 of the drawings each plate 66 has a pair of rollers 69 supported thereon in positions to respectively engage opposite side edges of the bottom flanges on the track 3 to limit lateral displacement of the load carrier 6 relative to the track 3.

The supporting bar 52 is shown in Figures 5 and 6 as having an arm 70 extending upwardly from the elongated part 57 of the bar 52 intermediate the ends thereof and positioned at the side of the track 3 opposite the side occupied by the brackets 32. The upper end 71 of the arm 70 projects laterally over the track 3 in a direction toward the brackets 32 and is spaced above the top of the track 3 to afford ample clearance for the arms 34 of the brackets 32. In use the end 71 of the arm 70 extends between the lower ends of the dogs 44 on the load bar 43 and is engaged by one or the other of said dogs, depending on the direction of movement of the chain 5. It will be noted that the width of the end portion 71 of the arm 70 is so determined with respect to the clearance space between the lower ends of the dogs 44 to enable swinging one or the other of the dogs to its released position while the end 71 is located between the dogs. As stated above, the dogs 44 are inclined downwardly in directions toward one another and the purpose of this constructon is to enable locating the end portion 71 between the dogs 44 by moving the carrier 6 in either direction along the track 3 relative to the load bar 43. It will of course be appreciated that the dimensions of the end portion 71 of arm 70 and the clearance space between the lower ends of dogs 44 are so determined with respect to the angular relation between the path of work advancing trolleys 4 and switch sections 14 when the latter are aligned with a branch track section, that the arm 71 will automatically separate from the dogs when load carriers 6 are transferred to a branch track.

As shown in Figure 8, the supporting bar 52 has a part 72 at the lower end of the arm 70 or, in other words, intermediate the ends of the bar and directly above the brace 56 on the bumper carrier 51. The part 72 has a bore extending therethrough transversely of the brace 56 and a bushing 73 is secured within the bore. The bushing 73 is adapted to support a bolt 74 and a U-shaped hanger 75 is in turn supported on the bolt. The leg portions of the hanger 75 are respectively positioned at opposite sides of the brace 56 and are apertured at the upper ends to receive the bolt 74. Thus, the hanger 75 is pivotally supported by the bumper carrier 51 midway between opposite ends thereof and may be employed to hold the parts to be handled by the conveyor. In practice the opposite ends of the bumper carriers 51 project beyond the work parts supported by the hangers 75 and hence the carriers 51 protect the work parts from contact with one another.

The reference character 76 in Figures 3, 14, 14A, 15 and 16 designates safety stop dogs respectively associated with the free ends of the fixed track sections 10 and 13 to prevent accidental movement of the trolleys 6 in a reverse direction when the switch section 14 is out of registration with either or both of the track sections 10 and 13. It is not necessary to provide a similar dog or stop on the fixed track section 12 as the link 26 is positioned across the top of the free end of the track section 12 and serves as a stop to prevent accidental disengagement of the trolleys from this track section when the switch section 14 is out of registration therewith.

Each dog 76 is at the same side of its track section as the brackets 32 to avoid interference with the upright arm 70 of the load supporting trolley 6. In detail, each dog 76 comprises a bell crank and is pivotally mounted intermediate the ends on a shaft 77 which extends laterally from a block 78 fixedly secured to the top of an adjacent fixed track section. The arm 79 of each dog 76 is fashioned to normally extend into the path of and be engaged by one of the plates 66 on an adjacent bracket 60 of the load supporting trolley 6. The normal position of each dog 76 is controlled by a lateral lug 80 which is integral with the arm 79 and which is adapted to rest upon the top of the adjacent track section. The arm 81 of each dog 76 has at its free end an upwardly extending V-shaped or wedge shaped portion 82 and the plate 27 has at its rear lower corners wedging surfaces 83 which upon movement of the plate transversely of one of said dogs are adapted to ride over the wedge shaped portion 82 to thereby swing the arm 81 downwardly and the arm 79 upwardly so that the latter clears the upper end of the plates 66. The arm 81 of each dog 76 is provided with an integral lateral lug 84 extending over and engageable with the top of the adjacent track section to limit swinging movement of the arm 79 on the dog 76 in an upward direction. It follows from the above that when the switch section 14 registers with either the track section 10 or the track section 13, the plate 27 on the operating link 26 engages the arm 81 of the associated dog 76 and holds the arm 79 in its raised position where it is out of the path of travel of the plates 66. The arrangement is such that the dogs 76 are not operated by successive trolleys 6 as they are advanced along the track 3.

To make each dog 76 reversible so that it may be located at either side of a fixed track section, the arms 79 and 81 are provided with the integral lateral lugs 85 and 86 respectively at the opposite side of and corresponding to the lugs 79 and 81. It will thus be seen that each dog is symmetrical with respect to the longitudinal median plane thereof.

Figures 1, 2:
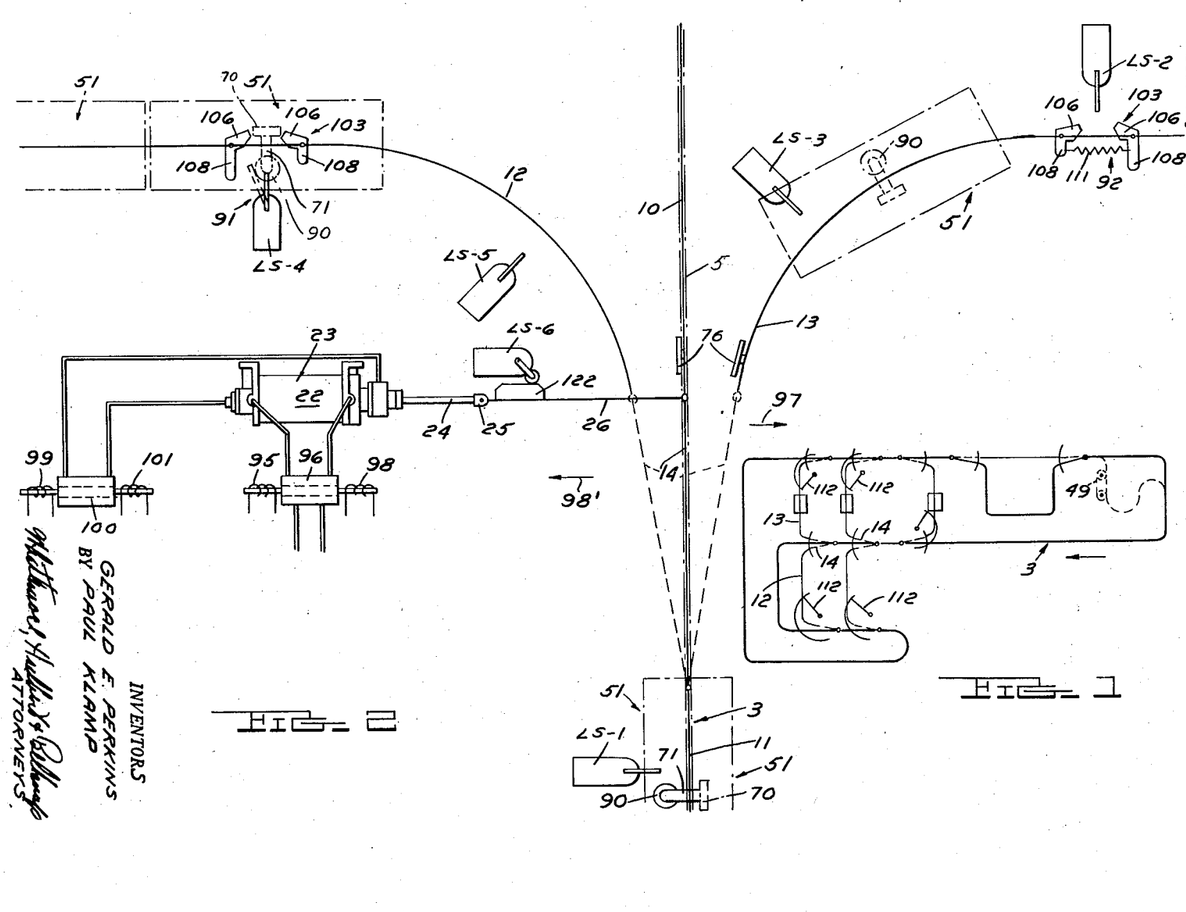
Figure 1 is a diagram illustrating one possible installation of a continuous conveyor embodying the features of this invention.
Figure 2 is a semi-diagrammatic plan view of a part of the conveyor system shown in Figure 1.

In Figure 1 of the drawings a diagram of a typical conveyor installation is shown. The heavy line in Figure 1 indicates the bottom track 3 and the light lines represent the fixed branch sections 12 and 13 of the track 3. In accordance with this invention the trolleys 6 along with the work parts carried thereby may be shunted from the main sections of the track 3 to positions on one or the other of the fixed branch track sections 12 and 13. It is apparent from the above description that the trolleys 6 on either of the branch track sections are disconnected from the power driven chain 5 and hence the trolleys 6 may be held stationary for indefinite periods without interrupting normal travel of the conveyor chain 5. This practice enables workmen to perform operations on the work parts which cannot be performed during advancement of the work parts by the conveyor.

Operation

Figure 19:
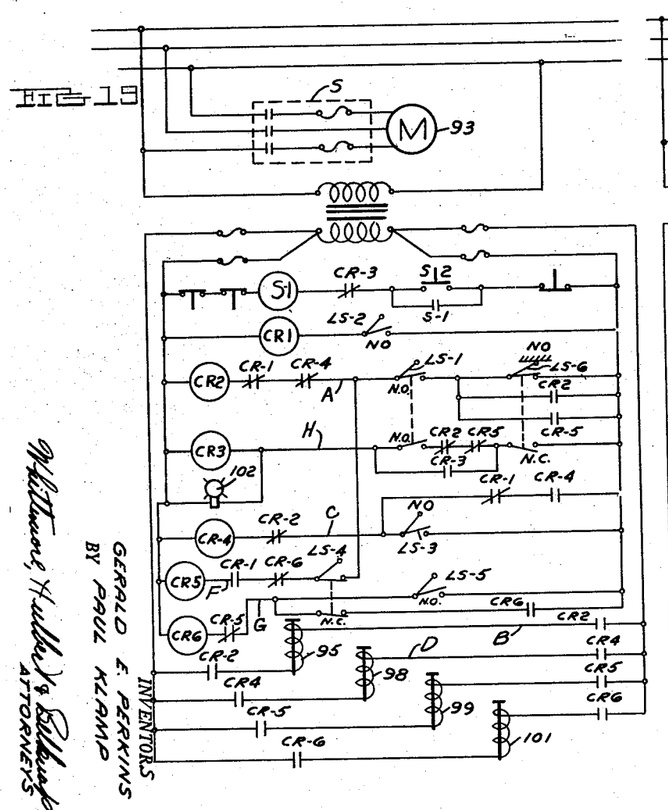
Figure 19 is an electrical diagram for the conveyor.

The operation of the conveyor described above will best be understood upon reference to Figures 2, 5 and 19 of the drawings. The movement of the switch section 14, for example, is controlled by a roller 90 carried by each work advancing trolley 6, and by a series of limit switches LS–1, LS–2, LS–3, LS–4, LS–5 and LS–6. The function of the track switch section 14 is to transfer the trolleys 6 from the main track 3 to suitable stop positions 91 and 92 on the respective branch sections 12 and 13 providing such positions are vacant or, in other words, are not occupied by trolleys 6. If both branch track sections are occupied by the trolleys 6, the switch section 14 remains in its straight intermediate position so that the trolleys 6 may continue their normal travel until they approach a vacant branch track. Should both branch track sections 12, 13 be vacant, the switch section 14 may be alternately swung from its intermediate position into registration with the branch track sections by successive trolleys 6 approaching the switch section 14. It is to be noted that the switch section 14 and branch tracks 12 and 13 are sloped sufficiently in a direction to propel the trolleys 6 to positions 103 by the action of gravity.

In Figure 19 the reference character 93 designates an electric motor for driving the chain 49 (Figure 1) and the character S designates a starter for controlling the operation of the motor 93. The coil of the motor starter S is indicated by $S_1$ and the push button for starting the motor is designated by $S_2$.

Assuming that a trolley 6 approaches the free end of a switch section 14 while the positions 91 and 92 on the respective branch track sections 12 and 13 are unoccupied and that the switch section 14 is in its intermediate position, it will be noted that operation of the limit switch LS–1 by the roller 90 on the approaching trolley 6 will cause the relay CR–2 in circuit A to be energized, assuming of course that the relay CR–4 is de-energized. As a result of energizing relay CR–2, the contactors CR–2 are closed in circuit B whereby the solenoid 95 of a two-position four-way valve 96 is energized to shift the valve in a direction such that the switch section 14 is swung by the fluid motor 22 in the direction of the arrow 97. When the limit switch LS–1 is released as a result of continued advancement of the associated trolley 6, the relay CR–2 is again de-energized.

When the trolley 6 reaches the limit switch LS–3 this switch is operated by the roller 90 on the trolley 6 and the relay CR–4 in circuit C is energized. As a result of energizing relay CR–4, contacts CR–4 in circuit D are closed and the solenoid 98 is energized to operate the valve 96 in a manner to cause the fluid motor 22 to return the switch section 14 to its central or intermediate position. The relay CR–4 is held energized by its associated hold-in contact after the limit switch LS–3 is again released by the associated trolley 6. The arrangement is such that the relay CR–2 is prevented from repeat operation which would enable a following trolley 6 to enter the branch track section 13.

When the trolley 6 reaches the stop position 92 or in other words, when the trolley operates limit switch LS–2, the relay CR–4 is de-energized by the opening of relay CR–1. It is to be understood that the relay CR–1 is energized by the limit switch LS–2 and takes over the function of preventing a second trolley 6 from moving to the position 92. With a trolley 6 in the position 92 but none in the position 91, a trolley moving past the limit switch LS–1 causes the switch section 14 to move in the direction of the arrow 98′. More particularly, closing of the limit switch LS–1 energizes the relay CR–5 in circuit F which in turn energizes the solenoid 99. The solenoid 99 moves the valve 100 in a direction to operate the fluid motor 22 and thereby swing the switch section 14 in the direction of the arrow 98′. The relay CR–5 can only be energized if the limit switch LS–2 is engaged by a trolley in the position 92 where it keeps the relay CR–1 energized through the medium of the limit switch LS–2. It is also important to note that the relay CR–5 cannot be energized if the limit switch LS–4 is engaged by a trolley 6 in the position 91. Thus, a trolley 6 approaching the pivoted end of the track switch section 14 will move to whichever branch track section is unoccupied and will move to the position 92 if both branch track sections 12 and 13 are unoccupied.

After a trolley 6 has been transferred to the track section 12 the limit switch LS–5 is closed to energize a relay CR–6 in circuit G to close the corresponding contacts and energize solenoid 101 and this solenoid moves the valve 100 in a direction to return the track switch section 14 to its central or intermediate position by the fluid motor 22. Also, the closing of the limit switch LS–5 will block the entrance of succeeding trolleys 6 to the position 91 by energizing relay CR–6 and opening its contact in circuit F. This function is also accomplished by opening the normally closed limit switch LS–4 in circuit F in the same manner previously described in connection with movement of a trolley to the position 92.

If the switch section 14 fails to return to its central or intermediate position, it is necessary to stop the conveyor in order to prevent successive trolleys 6 from being switched to one side or the other because there is only sufficient space on the branch track sections 12 and 13 to accommodate but one trolley 6. The required stopping of the conveyor is effected automatically by relay CR–3 in circuit H. In this connection it will be apparent from Figure 19 that if for any reason the switch section 14 is not in its intermediate or central position, the limit switch LS–6 is released by the actuator 122 on the link 26. Hence, if the limit switch LS–1 is operated by an approaching trolley 6 neither the relay CR–2 nor the relay CR–5 can be energized. However, the relay CR–3 is energized by limit switch LS–6 to open its normally closed contact in the motor starter control circuit and thereby discontinues the operation of the conveyor. If desired, a pilot light 102 may be provided in the circuit to indicate the reason why operation of the conveyor has been discontinued. In any case, when the cause of the difficulty has been eliminated, and the switch section 14 is returned to its central or intermediate position, the normally open contacts of limit switch LS–6 are closed by the dog 122 and the normally closed contacts of limit switch are opened to de-energize relay CR–3. As a result the motor 93 may be again started and operation of the conveyor continued.

Figure 11:
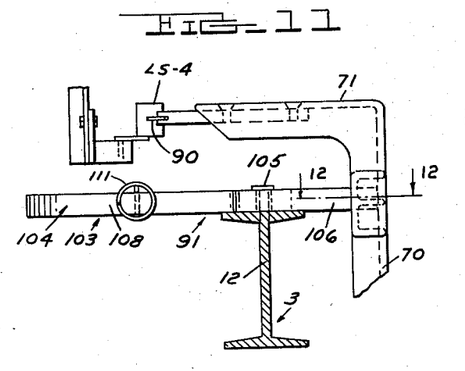
Figure 11 is a cross-sectional view taken on the line 11—11 of Figure 3.
Figure 12:
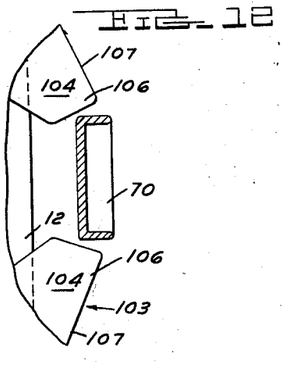
Figure 12 is a sectional view taken substantially on the line 12—12 of Figure 11.

It has been stated that the positions 91 and 92 are stop positions for trolleys 6 on the branch track sections 12 and 13. In detail, a stop 103 is provided at each of the positions 91 and 92. As shown in Figures 4, 11 and 12, each stop 103 comprises a pair of dogs 104 in the form of bell cranks pivoted by pins 105 intermediate the ends on the top of the adjacent branch track section. The arms 106 of the dogs 104 extend in directions toward one another and are adapted to receive the upright arm 70 of a trolley 6 therebetween. The outer edges 107 of the arms 106 are inclined as shown in Figure 4 of the drawings to enable movement of the upright arm 70 into the space between the ends of the bell crank arms 106.

The other arms 108 of the dogs 104 are connected by a suitable spring 109 which holds the dogs 104 against suitable stops 110 located on the adjacent track section to coact with the spring 109 to hold the dogs 104 in their desired relative positions. The stops 110 are in the form of pins which project upwardly from the top of the adjacent track section through enlarged openings 111 formed in the arms 106 of the respective dogs 104. The dogs 104 may be manually operated to release the trolleys 6 when desired, and for this purpose one of the arms 108 may be of sufficient length to provide a convenient grip.

Reference has been made above to the fact that the work carrying trolleys 6 may be switched onto either or both of the branch track sections 12 and 13 when desired. Eventually, the trolleys 6 on the branch tracks must be returned to the main track and this is accomplished in a unique manner by sweep arms 112 shown diagrammatically in Figure 1 of the drawings. Operation of the sweep arms 112 is initiated by means including a roller 113 (Figure 5) on the trolley 4. The sweep arms 112 and the operating means therefor is described and claimed in my copending application of Leonard J. Bishop and Paul Klamp, Serial No. 310,856, filed September 22, 1952, now U.S Patent 2,853,955 granted Sept. 30, 1958.

Figure 20:
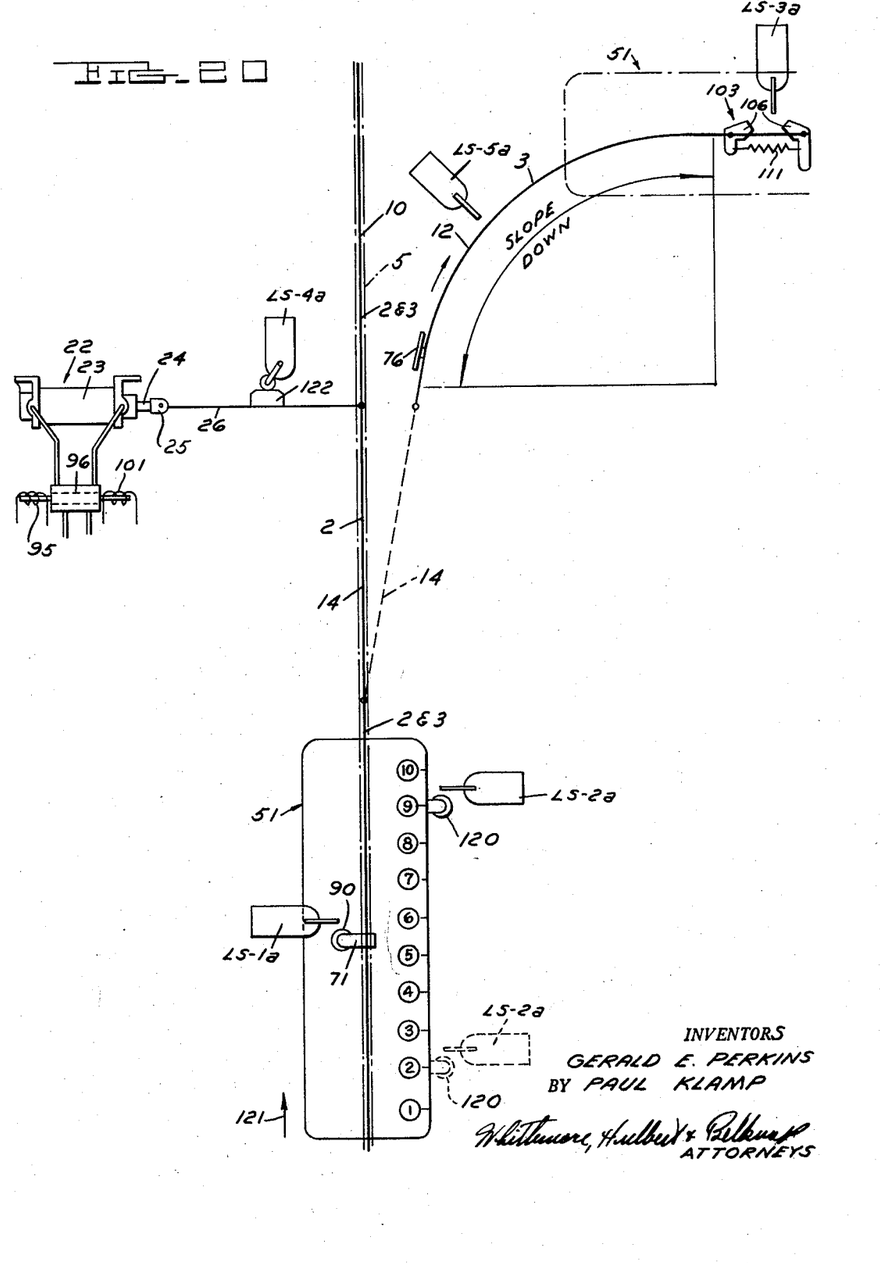
Figure 20 is a semi-diagrammatic plan view showing a part of a modified conveyor structure.
Figures 21, 22:
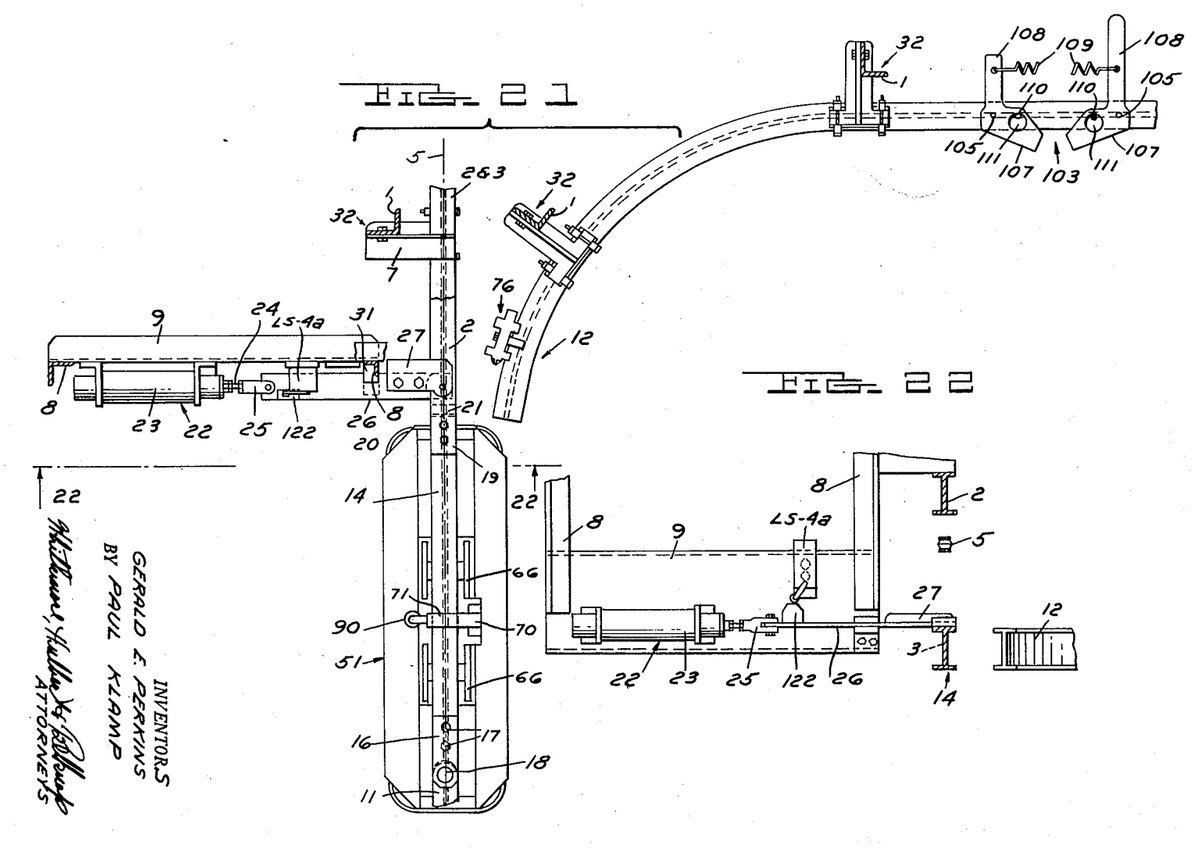
Figure 21 is a fragmentary plan view partly in section of the part of the conveyor shown in Figure 20.
Figure 22 is a sectional view taken substantially on the line 22—22 of Figure 21.

The embodiment of the invention shown in Figures 20 to 23 inclusive is directed generally to apparatus enabling pre-selected work carrying trolleys 6 to be moved into a branch or repair line of the conveyor system. In Figures 20, 21 and 22, a two-position installation is shown in the interests of simplicity and it will be noted that the structure is similar to the one previously described with the exception that only one branch track is shown. Hence, the same reference characters are employed to designate corresponding parts.

Figure 13:
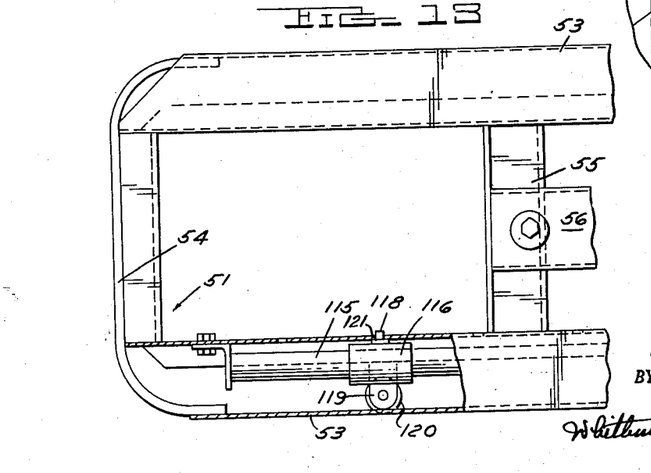
Figure 13 is a fragmentary plan view partly in section of one of the bumper carriers forming a part of the conveyor.

As shown in Figures 5, 6 and 13 of the drawings, each bumper carrier 51 has a tube 115 which extends lengthwise of the bumper 51 along one longitudinal edge and serves as a supporting rail for a slide 116. The slide 116 has a depending part 117 formed with a laterally inwardly extending projection 118 and with a bifurcated portion 119 having a limit switch operating roller 120 thereon. The projection 118 is positioned to selectively engage in slots 121 formed in the adjacent side of the carrier bumper 51 and spaced from one another in the direction of length thereof. Although the number of slots 121 may be varied to suit different installations, nevertheless, ten slots are shown for the purpose of illustration and these slots are numbered 1 to 10 inclusive for convenience as illustrated in Figs. 6 and 20, the numerals being shown circled. The above construction is such that the slide 116 may be rocked about the tube 115 in a direction to release the projection 118 from the associated slot 121 when it is desired to chaneg the location of the roller 120 with respect to the carrier bumper 51.

Figure 23:
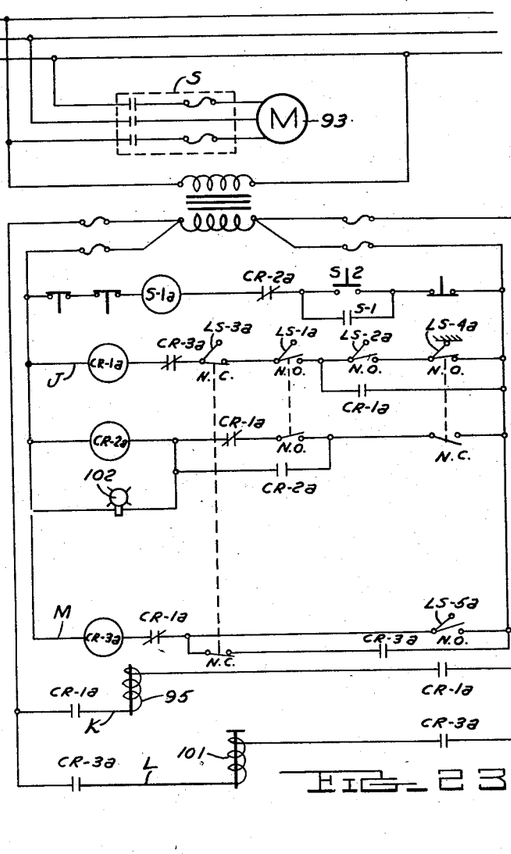
Figure 23 is an electrical wiring diagram for the embodiment of the invention shown in Figures 20–22 inclusive.

The operation of the above structure will be best understood upon reference to the electrical wiring diagram shown in Figure 23. The movement of the switch section 14 (Figure 20) by the fluid motor 22 is controlled by the switch operating roller 90 (previously described as supported on the upright arm 70 of a trolley 6), the selector roller 120 on the bumper carrier 51, and by limit switches LS–1$^A$, LS–2$^A$, LS–3$^A$, LS–4$^A$, and LS–5$^A$. As will be more fully understood from the following description, the function of the track switch section 14 is to enable movement of pre-selected trolleys 6 from the main track to the stop position 103 on the branch track 12, providing the latter is not occupied by a trolley 6. Those trolleys 6 which are not pre-selected for movement to the stop position 103 on the branch track 12 have no effect on the switch section 14 and hence move along the main track 3 in a normal manner.

The limit switches LS–1$^A$ and LS–2$^A$ in Figure 20 must be simultaneously operated in order to initiate swinging movement of the track section 14 from its central or straight line position to a position in registration with the branch track section 12. For example, when the limit switch LS–2$^A$ and roller 120 on a bumper carrier 51 are in either of the relative full and broken line positions shown in Figure 20, simultaneous operation of both limit switches LS–1$^A$ and LS–2$^A$ is obtained upon movement of the bumper carrier 51 in the direction of the arrow 121. Hence the aforesaid bumper carrier 51 causes the switch section 14 to swing into registration with the branch track 12 as the bumper carrier 51 approaches the pivoted end of the switch section 14. Any trolley 6 or bumper carrier 51 approaching the switch section 14 having a different relative positioning of the roller 120 and limit switch LS–2$^A$ merely causes a successive operation of the limit switches LS–1$^A$ and LS–2$^A$, and hence has no effect on the switch section 14. For example, if the switch LS–2$^A$ is in the full line position shown in Figure 20 of the drawings and the roller 120 is in the position "8" on the bumper carrier 51, the switch LS–2$^A$ is operated some time after the roller 90 operates the limit switch LS–1 and the switch section 14 remains in its straight line position. In other words, a trolley 6 may be moved onto any pre-selected branch track 12 by merely relatively adjusting the roller 120 and limit switch LS–2$^A$ so that the latter is operated at the same time the limit switch LS–1$^A$ is operated by the roller 90.

With the above in view reference is made more particularly to Figures 20 and 23 of the drawings wherein it will be noted that the contacts of limit switch LS–3$^A$ are closed if no trolley 6 is on the branch track 12. Also assuming that the switch section 14 is in its central or straight line position, it will be seen that the normally open contact of limit switch LS–4$^A$ is closed by the part 122 on the link 26 for operating the switch track section 14. With the parts in the above positions simultaneous operation of limit switches LS–1$^A$ and LS–2$^A$ by an approaching trolley 6 will cause relay CR–1$^A$ in circuit J to become energized. The contacts of relay CR–1$^A$ in circuit K, in turn, energizes the solenoid 95 of the valve 96 and thereby operates the fluid motor 22 to shift the switch section 14 into registration with the branch track 12.

As the approaching trolley 6 passes along the branch track section 12 the roller 90 on the trolley 6 engages the normally open limit switch LS–5$^A$ and closes its contact. Thus the contacts, in circuit L, of the control relay CR–3$^A$ in circuit M are closed and the solenoid 101 of the valve 96 is energized with the result that the switch track section 14 is swung back to its central or straight line position by the fluid motor 22.

Relay CR–3$^A$ is held energized by a hold-in contact CR–3$^A$ until LS–3$^A$ is operated by a trolley 6, so that the normally closed contacts CR–3$^A$ and LS–3$^A$ in the circuit of relay CR–1$^A$ are opened successively to prevent operation of relay CR–1$^A$ until the trolley 6 has been moved out of the stop position 103. Hence it is not possible for a second work advancing trolley 6 to be switched to the track section 12 until the preceding trolley 6 has been moved out of the way.

The distance between the limit switches LS–1$^A$ and LS–5$^A$ is less than the spacing between adjacent work advancing trolleys 6 so that a trolley 6 entering the branch track section 12 closes the normally open limit switch LS–5$^A$ and returns the switch section 14 to its central position before the succeeding trolley 6 reaches the track section 14.

If for some reason the switch section 14 is not in the proper position the motor 93 for driving the conveyor chain 5 is stopped. The manner is which this is accomplished is clearly described in connection with the first embodiment of this invention.

What we claim as our invention is:

1. Means for operating the switch track section of a conveyor system having a main track composed of first and second sections spaced from one another, a branch track section positioned to one side of said second main track section, a switch track section extending between the adjacent ends of said main track sections and movable from a first position in registration with said second main track section to a second position in registration with said branch track section, work advancing trolleys supported by and movable along said track sections, and propelling means for advancing trolleys along said main track sections; said switch track section operating means comprising power means connected to said switch track section for alternately moving the same into said first and second positions in respective registration with said second main track section and said branch track section, a first means for selectively controlling said power means to thereby position said switch track section in said second position in registration with said branch track section, said first means comprising responsive devices spaced longitudinally along said track at a predetermined relative distance from each other, and actuating devices carried by certain of said trolleys spaced at the same predetermined distance, and said first means requiring the simultaneous actuation of said responsive devices by said actuating devices for said selective control of said power means, a second means operated by a trolley moving along said branch track section for controlling said power means to return the switch track section to its first position aforesaid, means for holding a trolley at a predetermined position on said branch track section, and means for rendering said switch operating power means inoperative to move said switch track section from said second position during the time that a trolley occupies said predetermined position.

2. Operating means in accordance with claim 1, in which said last named means includes a control device in position to be engaged and operated by a trolley when at said predetermined position, said actuating devices having means to mount the same for relative adjustment longitudinally of said trolley in the direction of its movement.

References Cited in the file of this patent
UNITED STATES PATENTS

| | | |
|---|---|---|
| 275,465 | Capen | Apr. 10, 1883 |
| 519,351 | Schmidt | May 8, 1894 |
| 800,626 | Cherry et al. | Oct. 3, 1905 |
| 815,320 | Carpenter | Mar. 13, 1906 |
| 902,035 | Wightman | Oct. 27, 1908 |
| 967,869 | Fitzerald | Aug. 16, 1910 |
| 1,333,183 | Neller | Mar. 9, 1920 |
| 1,379,614 | Bennington | May 31, 1921 |
| 1,396,690 | Mikulic | Nov. 8, 1921 |
| 1,443,382 | Rapier | Jan. 30, 1923 |
| 1,602,379 | Lawrence | Oct. 5, 1926 |
| 1,625,501 | Robertson | Apr. 19, 1927 |
| 1,797,864 | Harlandt | Mar. 24, 1931 |
| 1,921,109 | Webb et al. | Aug. 8, 1933 |
| 1,958,162 | Diehl | May 8, 1934 |
| 2,116,430 | Gordon | May 3, 1938 |
| 2,194,057 | Simpson | Mar. 19, 1940 |
| 2,201,013 | Rosenthal | May 14, 1940 |
| 2,210,171 | Horn | Aug. 6, 1940 |
| 2,336,551 | Kumler | Dec. 14, 1943 |
| 2,344,155 | McBride et al. | Mar. 14, 1944 |
| 2,360,064 | Lewis | Oct. 10, 1944 |
| 2,401,115 | Spafford | May 28, 1946 |
| 2,510,318 | Rose | June 6, 1950 |
| 2,688,934 | Quail | Sept. 14, 1954 |
| 2,714,355 | Benson | Aug. 2, 1955 |
| 2,877,718 | Mittag | Mar. 17, 1959 |

FOREIGN PATENTS

| | | |
|---|---|---|
| 487,860 | Germany | Dec. 18, 1929 |

OTHER REFERENCES

"Automatic Materials Handling," issued by The Louden Machinery Co., Fairfield, Iowa, U.S.A.: printed in U.S.A. 5–46; publication contains 24 pages in addition to cover.